M. F. BAGLEY.
Grain-Car Door.
No. 221,270. Patented Nov. 4, 1879.
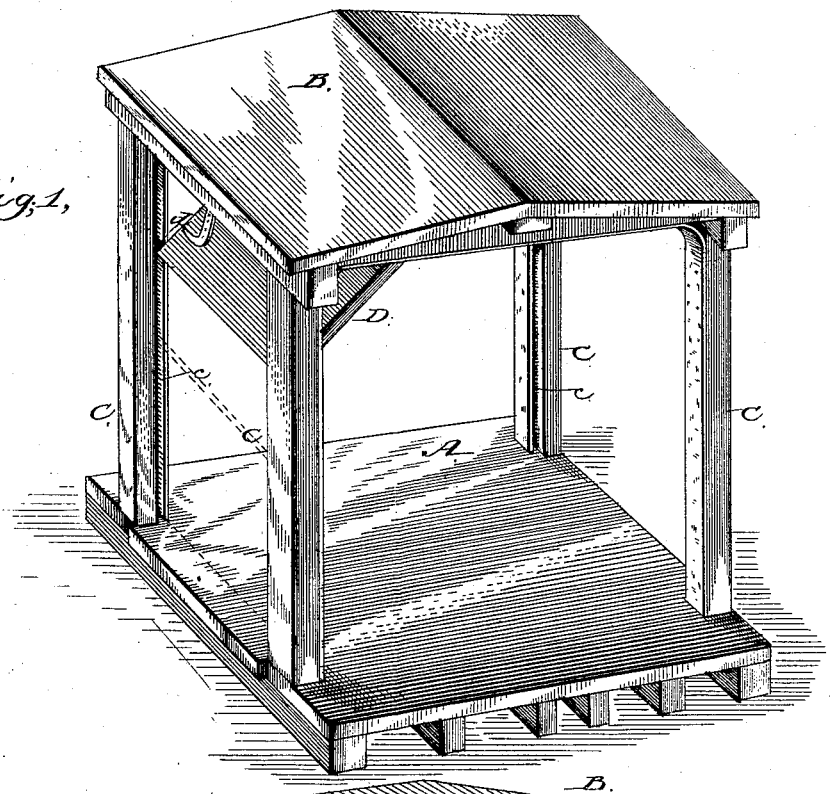
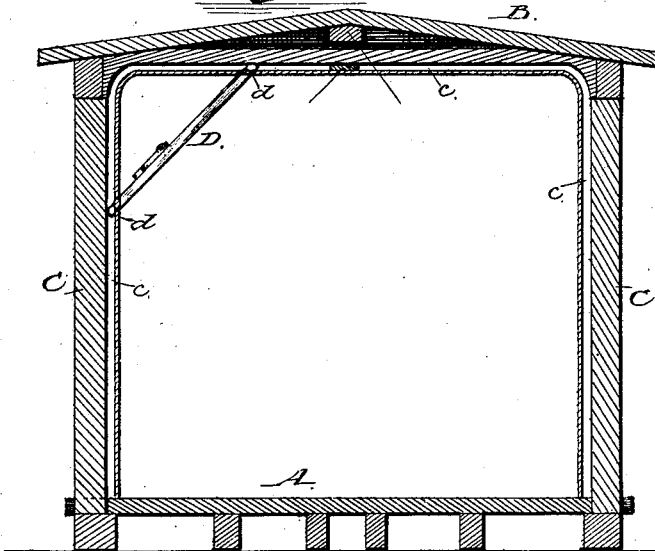

UNITED STATES PATENT OFFICE.

MOSES F. BAGLEY, OF MOUNT VERNON, ILLINOIS.

IMPROVEMENT IN GRAIN-CAR DOORS.

Specification forming part of Letters Patent No. 221,270, dated November 4, 1879; application filed September 18, 1879.

*To all whom it may concern:*

Be it known that I, MOSES F. BAGLEY, of Mount Vernon, county of Jefferson, and State of Illinois, have invented certain new and useful Improvements in Grain-Car Doors; and I do hereby declare the following to be a full, clear, and exact description thereof, reference being had to the accompanying drawings, making a part of this specification, and in which—

Figure 1 represents the body of a grain-car with my door attached. Fig. 2 is a vertical sectional view.

My invention relates to improvements in doors for grain-cars; and the improvement consists in a novel construction and arrangement of parts whereby a rigid car-door, when not in use, may be easily carried close up under the roof of the car and there remain out of the way until the car is to be filled.

To enable others skilled in the art to make and use my invention, I will proceed to describe the exact manner in which I have carried it out.

In the drawings, A represents the floor of the grain-car, B the roof, and C C standards or uprights supporting the roof, and forming the frame of the door. A continuous way or groove, c, is made in the frames on each side of the door and across under the roof in the rafters supporting it. At the angle of the sides and roof I prefer making a curve in the way or groove rather than an abrupt turn.

The door D is provided at each corner with a lug, d, two of which move in each of the ways c c. When the grain is to be removed from the car the door is carried upward in the ways to the roof, and thence horizontally under the roof to a point half-way across, where it is arrested by stops in the grooves. The lugs and rounded corners allow the door to turn the angle with ease.

I am aware that heretofore grain-car doors have been arranged to slide up by lugs in grooves to the eaves of the car and then be swung up under the roof; also, that car-doors have been made of slats jointed to each other, so as to make a flexible door, said door being provided with eyes running on rods passing up the sides of the cars and along the roof; or said doors sliding by their ends in grooves arranged in the sides and roof of the car; but these jointed doors are expensive, liable to derangement by grain getting in the joints, and liable to be sprung out of close contact with the side of the car; but I am not aware of a rigid door having been arranged by lugs or pintles to similarly slide up and pass the corner of the eaves in a similar manner.

Having thus described my invention, what I claim as new, and desire to secure by Letters Patent, is—

The rigid door D, provided with the lugs or projections d d, in combination with the grooved ways c c, extending up the sides and along under the roof of the car, whereby the door of a grain-car may be slid up and around the corner of the side and roof and lodged beneath the roof of the car, substantially as and for the purpose set forth.

MOSES FRENCH BAGLEY.

Attest:
WM. H. SMITH,
W. H. HINMAN.